United States Patent
Suffern et al.

(10) Patent No.: US 7,519,168 B2
(45) Date of Patent: *Apr. 14, 2009

(54) HOST COMPUTER DIGITAL SIGNAL PROCESSING SYSTEM FOR COMMUNICATING OVER VOICE-GRADE TELEPHONE CHANNELS

(75) Inventors: Robert C. Suffern, River Forest, IL (US); Andrew L. Norrell, Nevada City, CA (US)

(73) Assignee: 3Com Corporation, Marlborough, MA (US)

( * ) Notice: Subject to any disclaimer, the term of this patent is extended or adjusted under 35 U.S.C. 154(b) by 1265 days.

This patent is subject to a terminal disclaimer.

(21) Appl. No.: 10/715,589

(22) Filed: Nov. 18, 2003

(65) Prior Publication Data

US 2004/0096045 A1 May 20, 2004

Related U.S. Application Data

(63) Continuation of application No. 09/609,096, filed on Jun. 30, 2000, now Pat. No. 6,693,997, which is a continuation of application No. 09/246,738, filed on Feb. 8, 1999, now Pat. No. 6,097,794, which is a continuation of application No. 08/948,833, filed on Oct. 10, 1997, now Pat. No. 5,872,836, which is a continuation of application No. 08/466,079, filed on Jun. 6, 1995, now Pat. No. 5,724,413, which is a continuation of application No. 08/037,075, filed on Mar. 25, 1993, now Pat. No. 5,646,983.

(51) Int. Cl.
*H04M 11/00* (2006.01)
*H04B 1/38* (2006.01)

(52) U.S. Cl. .............. 379/93.32; 379/93.28; 379/93.05

(58) Field of Classification Search .............. 379/93.32, 379/88.03, 93.17, 93.26, 93.28, 93.33; 375/222, 375/232, 219, 224, 354–356; 370/290, 354
See application file for complete search history.

(56) References Cited

U.S. PATENT DOCUMENTS

| 4,085,449 A | 4/1978 | Walsh et al. |
| 4,453,259 A | 6/1984 | Miller ........................ 375/106 |
| 4,455,661 A | 6/1984 | Qureshi |
| 4,518,823 A | 5/1985 | Kessler |

(Continued)

OTHER PUBLICATIONS

CCITT Recommendation T.4 on "Standardization of Group 3 Facsimile Apparatus for Document Transmission."

(Continued)

*Primary Examiner*—Melur Ramakrishnaiah
(74) *Attorney, Agent, or Firm*—McDonnell Boehnen Hulbert & Berghoff LLP

(57) ABSTRACT

A conventional computer is coupled to an analog telephone transmission link by means of an analog/digital conversion interface adapter. Modem transmission is accomplished by performing the modulation and demodulation functions digitally in the computer's existing processor which executes programs which transfer data between the computer's memory and the interface adapter. Using the same interface adapter and existing processor, the arrangement may be used to send and receive images in the form of standard V.29 format facsimile data, to send and receive data operating as a synchronous IBM 3270 compatible terminal device, or to record and play back conventional voice transmissions rather than data to implement a telephone answering, voice message handling, and telemarketing systems.

51 Claims, 3 Drawing Sheets

U.S. PATENT DOCUMENTS

| | | |
|---|---|---|
| 4,646,320 A | 2/1987 | Krishnan |
| 4,680,773 A | 7/1987 | Amundson |
| 4,700,358 A | 10/1987 | Duncanson et al. |
| 4,890,316 A | 12/1989 | Walsh et al. |
| 4,965,641 A | 10/1990 | Blackwell et al. |
| 4,989,221 A | 1/1991 | Qureshi et al. ............... 375/8 |
| 5,008,901 A | 4/1991 | Wallach et al. |
| 5,170,470 A | 12/1992 | Pindar et al. |
| 5,175,633 A | 12/1992 | Saito et al. |
| 5,283,638 A | 2/1994 | Engberg et al. |
| 5,359,709 A | 10/1994 | Blanc et al. |
| 5,365,545 A | 11/1994 | Blackwell et al. |
| 5,646,983 A | 7/1997 | Suffern et al. ............ 379/93.32 |
| 5,724,413 A | 3/1998 | Suffern et al. ............... 379/98 |
| 5,872,836 A | 2/1999 | Suffern et al. ............ 379/93.26 |
| 6,097,794 A | 8/2000 | Suffern et al. ............ 379/93.32 |
| 6,693,997 B1 | 2/2004 | Suffern et al. ............ 379/93.28 |

OTHER PUBLICATIONS

The Theory and Practice Modem Design, by John A.C. Bingham, pp. 166-167, 226-231, and 282-286 (1988).

"Microcomputer RTTY . . . a Software TU—use your 8080 and very little else," 73 Magazine for Radio Amateurs, pp. 78-82 (Jul. 1979).

HOST COMPUTER DIGITAL SIGNAL PROCESSING SYSTEM FOR COMMUNICATING OVER VOICE-GRADE TELEPHONE CHANNELS

COPYRIGHT NOTICE

A portion of the disclosure of this patent document contains material which is subject of copyright protection. The copyright owner has no objection to the facsimile reproduction by anyone of the patent document or the Patent and Trademark Office patent file or records, but otherwise reserves all copyright rights whatsoever. Copyright 1993 U.S. Robotics, Inc.

FIELD OF THE INVENTION

This invention relates to electronic communications systems and more particularly to a system for enabling a computer to transmit and receive information over an analog communications link.

BACKGROUND OF THE INVENTION

Computers typically use modems to communicate digital information over voice-grade telephone lines. Such modems translate digitally expressed information from the computer into analog tone signals suitable for transmission over the voice-grade telephone facility, and convert such tones back into digital form when received from the telephone line.

High speed modems may advantageously employ digital signal processing techniques for translating outgoing digital data into a sequence of digital values each representing a desired analog output signal sample amplitude. These digital sample values may then be converted into analog form by a digital-to-analog converter for transmission over the telephone facility., Correspondingly, at the receiving station, the incoming analog signal may be converted into a train of digital sample amplitude values which are then processed to reconstruct the original digital data.

The processing of the digital sample values is complex and has heretofore been accomplished by one or more dedicated microprocessors which form the heart of the digital modem. For example, the 9600 baud HST modem manufactured by U.S. Robotics Corporation and described in U.S. Pat. No. 5,008,091 issued on Apr. 16, 1991 employs three microprocessors: (1) a transmitting microprocessor dedicated primarily to the translation of digital data into digital sample values; (2) a receiving microprocessor devoted primarily to the translation of sample amplitude values back into digital data; and (3) a supervisory microprocessor which serves as the interface to the computer to which the modem is connected.

SUMMARY OF THE INVENTION

The present invention, like the digital modems described above,. employs analog/digital conversion methods to convert received analog signals into digitally expressed analog sample values and, during transmission, to convert digitally expressed sample values, into analog form. Unlike prior digital modems, however, in the present invention the digital sample value; signals are not processed by a separate processor or processors within the modem unit, but are rather processed by the microprocessor already present in the connected computer. As a consequence, the cost of the modem is substantially reduced because the need for separate processors is eliminated.

The arrangement contemplated by the invention is implemented by the combination of a conventional host computer employing a microprocessor and a low-cost interface unit consisting of telephone line adaptor circuitry, an analog/digital converter, and a direct digital interface to the host computer's system I/O bus. The telephone interface unit exchanges digitally-expressed analog sample amplitude values directly with the connected host computer, and the microprocessor within the host computer handles the remainder of the digital processing.

When operating as a modem, digital data can be processed into a sequence of digitally expressed sample values in accordance with a selected one of several accepted modem formats and transmission speeds. Given processors of speeds typically available, such modem processing can take place in real time to eliminate the need for storing the digital sample data in memory; for example, using the preferred embodiment of the invention to be described, a relatively slow Intel 80286 (IBM-AT class) processor operating at 12 mhertz has been shown to have adequate computational capability to perform the modulation and demodulation processing needed for 2400 baud full-duplex modem operation.

Without requiring any additional hardware, the system may be programmed to send and receive graphical data as standard V.29 format facsimile data, or to send and receive data synchronously operating, for example, as an IBM 3270 compatible terminal device. Moreover, when the digital sample values represent conventional voice transmissions rather than data, the system may be used to provide automated voice recording and playback functions to implement a telephone answering, voice message handling, and telemarketing systems.

These and other functions may be added or revised without requiring any hardware modifications by simply changing standard programs which execute on the host processor in standard ways.

These and other features and advantages of the present invention will become more apparent by considering the following detailed description of a preferred embodiment of the invention. In the course of this description, reference will frequently be made to the attached drawings.

DETAILED DESCRIPTION

Figure 1:
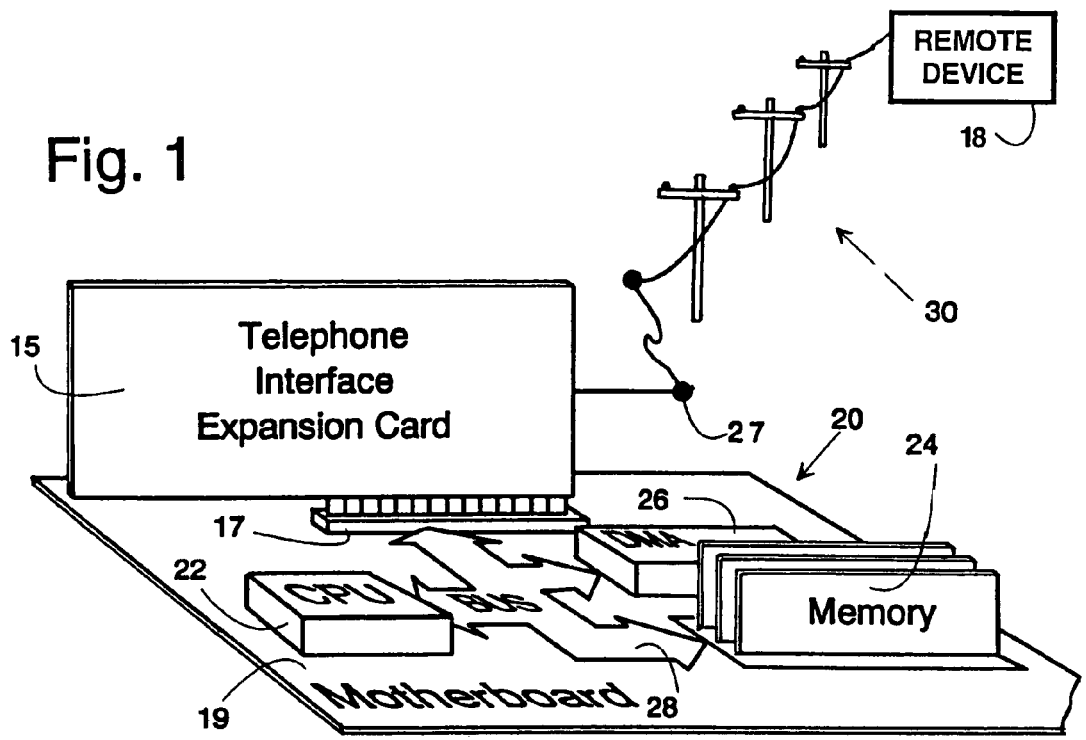
FIG. 1 illustrates the major hardware components of the preferred embodiment of the invention.

The preferred embodiment of the invention as illustrated in FIG. 1 consists of auxiliary components mounted on an expansion card 15 which plugs into an available socket 17 on the motherboard 19 of a conventional IBM-compatible Personal-Computer indicated generally at 20. The host computer 20 includes a conventional single-chip integrated microprocessor 22 which executes programs stored in a RAM memory unit which is depicted in FIG. 1 as a group of SIMM (single inline memory module) devices 24 mounted on the motherboard 19. The RAM memory 24 is typically loaded with programs to be executed by the microprocessor 22 from their permanent storage location on a magnetic disk drive (not shown). The programs described which will be described below in connection with this preferred embodiment of the invention are executable on any IBM-compatible personal computer using the MS-DOS operating system. In order to provide adequate computational capacity, the microprocessor 22 is preferably be selected from the Intel 80286, Intel386 or Intel486 families of processors, or their functional equivalents, and should operate at a clock rate of at least 12 megahertz. In the description to follow, reference will also be made to the host computer's standard DMA (direct memory access) controller seen at 26 in FIG. 1. The host computer 20 includes an internal system bus 28 which interconnects the microprocessor 22, the random access memory 24, the DMA controller 26 and the expansion card 15 via the expansion socket 17.

Figure 2:
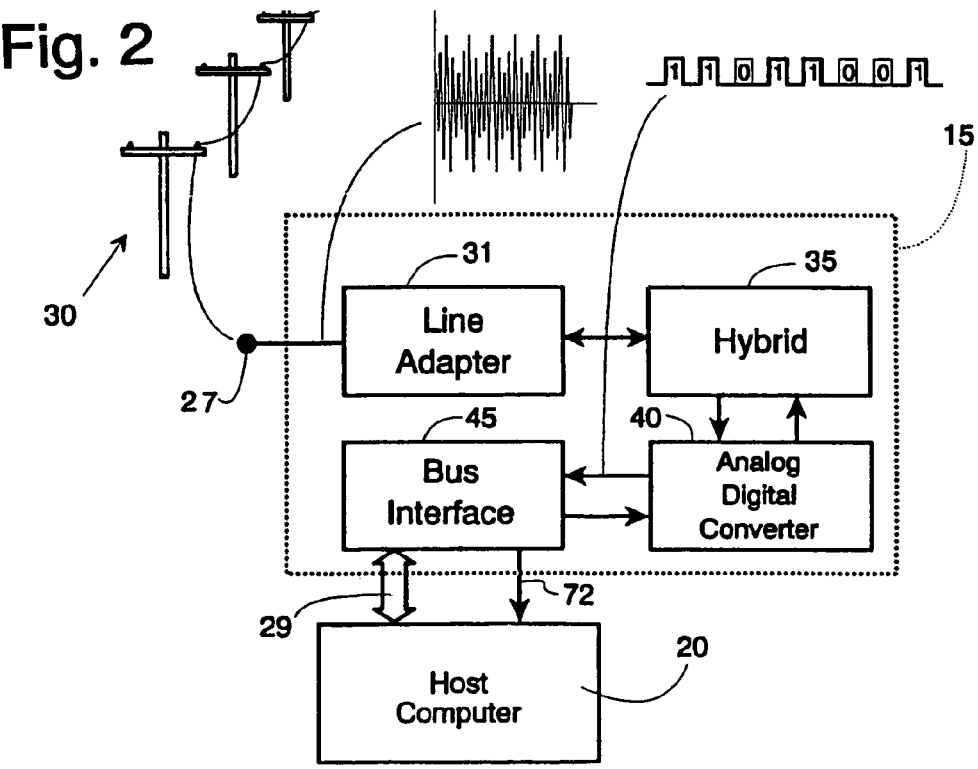
FIG. 2 is a block diagram of the major components of the interface card.

As seen in both FIGS. 1 and 2, the expansion card 15 is provided with a standard telephone jack 29 through which a connection is made to a conventional voice-grade telephone line 30. The major components included on the interface card 15 are seen FIG. 2. The card 15 takes the form of a standard "half-size adapter card" which plugs into an available expansion slot 17 on the host computer 20 to connect to the host computer's internal bus 28. Detailed information on the structure and operation of the interface bus 28, as well as other aspects of the personal computer system 20, may be found in the applicable *IBM Technical Reference Manual,* IBM Corporation, Boca Raton, Fla. 33432. Details concerning the Intel family of microprocessors and their companion DMA controllers appears in the *Intel Microprocessor and Peripheral Handbook* (1990), Intel Corporation,. Santa Clara, Calif.

The interface card sends and receives analog signals over a voice-grade analog telephone line which is connected at the terminal 29. Two standard RJ11 telephone jacks (not show) may be used to provide convenient external connections to standard telephone equipment, one Jack accepting a plug from the telephone line and the second a plug from a telephone station set which may share use of the line.

As seen in FIG. 2, the interface card includes a line adaptor circuit interconnects the telephone terminal 29 with a hybrid circuit which splits the analog voice-band signal into inbound and outbound components which are respectively sent to and received from the analog ports of an analog/digital converter 40 (also called the "AIC" or "analog interface chip"). Converter 40 samples received voice-band signals, encodes the sample amplitudes into digitally-expressed values, and sends these values via bus interface circuitry seen at 45 in FIG. 2 to the host computer 20. As described in more detail below, the conventional processor within the host computer 20 processes incoming digitally-expressed sample values to perform one of a variety of functions, depending on the nature of the incoming signal.

Outbound communications originate within the host computer 20 which processes the information to be sent to create a sequence of digitally-expressed sample amplitude values which are sent via the interface circuitry to the converter 40 which transforms the digital sample values into the corresponding voice band analog signal which is applied via the hybrid circuit 35 and the line adapter 31 to the telephone line connected to terminal 29.

Signal Reception

Figure 3:
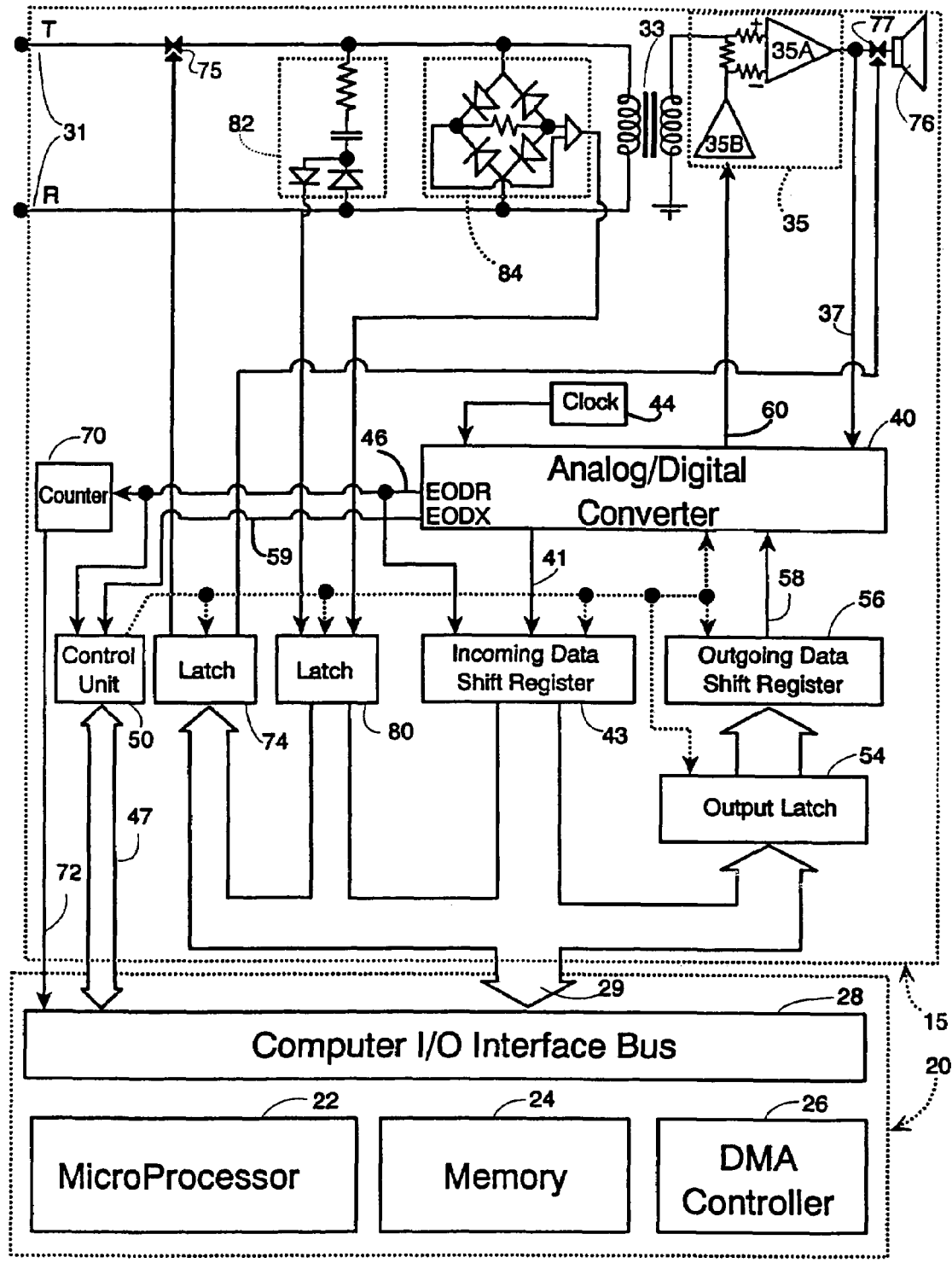
FIG. 3 is a detailed block diagram of the interface card.

The processing of the incoming voice-grade signal in the interface card is shown in more detail in FIG. 3. The incoming voice-band signal arriving at terminals 31 seen in FIG. 3 may be a conventional telephone voice signal, a modulated-tone data signal from a modem, a facsimile signal, or some other signal capable of being transmitted over conventional telephone links. Regardless of their content, incoming and outgoing signals are processed in the same way by the interface card 15.

Arriving signals from the telephone link are applied directly via a transformer 33 to the input of an amplifier 35A within a hybrid network 35. The signal appearing at the output of amplifier 35A is applied to the analog input terminal 37 of a two-way analog/digital converter 40. The hybrid network 35 is of conventional design and includes a transmit amplifier 35B which is interconnected with the input to amplifier 35A by means of a resistive network which is arranged such that the transmitted signal from amplifier 35B is greatly reduced in magnitude at the output of the receiving amplifier 35A.

The converter 40 preferably takes the form of a single integrated circuit device comprising a Model TLC32044 voice band analog interface unit manufactured by Texas Instruments, Dallas, Tex. Detailed information on the structure and operation of the TLC32044 is contained in Data Sheet D3098 (1988) available from Texas Instruments. The TLC32044 integrates an input analog bandpass filter, an analog-to-digital converter including a sample and hold circuit and a successive approximation encoder which converts the input analog signal on line 37 into a 14-bit resolution digital signal. For processing outbound signals, the TLC320444 includes a 14-bit resolution digital-to-analog converter and a low-pass output reconstruction filter.

The incoming analog signal is applied via line 37 seen in FIG. 3 to the converter 40 and the resulting digitally-expressed sample values are delivered via a bit-serial line 41 into an incoming data shift register 43. When the converter 40 completes the encoding of a sample of the incoming telephone signal, the shift register 43 holds a 16-bit binary word whose 14 most significant bits specify the amplitude of a sample. The value accumulated in shift register 43 is then transmitted via a data bus 29 to the data port pins of the computer's interface bus 28 during a DMA memory transfer operation as next described.

The analog/digital converter 40 is timed by a clock signal from a clock generator 44 seen in FIG. 3. When the converter has delivered the last (least significant) bit via its bit-serial output 41, an EODR (end of data received) output 45 from converter 40 activated to inform a control unit 50 that the data in the incoming shift register 43 is ready for transmission. Control unit 50 then issues a direct memory access request signal which is transmitted to the interface bus 28 via a control line in the group of control lines depicted in FIG. 1 at 47.

The interface card 15 preferably makes use of two separate DMA channels which are available in IBM-compatible Personal Computers for use by external devices. The receive channel, which moves incoming information via the shift register 43, is activated by a request to DMA channel 6 (DREQ6 at pin D13 on the standard IBM system bus 28). The DMA controller 26 within the personal computer 20 responds with a DMA acknowledge signal which is returned to the control unit 50 via one of the control lines 47 (connected to receive the signal DACK6 at pin D12 on the system bus 28). The control unit 50 responds to the DMA acknowledgement by gating the information from shift register 43 to the computer interface bus 28 via the data bus lines 29.

Signal Transmission

The analog output signal to be transmitted over the phone line is generated by the analog/digital converter 40 which receives digital words, each comprising a 14-bit sample amplitude value and two control bits, from the I/O interface bus 28 via the bus lines 29, an output latch register 54, and an outgoing data shift register 56. The latch register 54 holds one digital sample while the sample previously received from the bus 28 is being sent, one bit at a time, from the shift register 56 to the analog/digital converter 40 via the bit-serial line 58.

The transfer of information between the bus 28 and the output latch register 54 is also accomplished by means of a DMA transfer. In this case, when the analog/digital converter completes the conversion of a word from the shift register 56, it issues an EODX (end of data transmit) signal on line 59 to the control unit 50 which in turn issues a transfer request to DMA channel by activating one of the lines in the control bus 47 (signal DREQ5 applied to pin D11 of the interface slot to bus 28). The DMA controller 26 acknowledges that it is ready to handle the request by activating another of the control lines 47 (signal DACK5 at pin D10 of the interface slot). The control unit responds by transferring the contents of output latch 54 into shift register 56, and by enabling the output latch 54 to receive the data from interface bus 28 via the data bus 29.

The bit-serial data applied to converter 40 via line 58 is converted into an analog signal appearing at analog output 60 of the converter 40. The analog output signal on line 60 is then transmitted by the hybrid amplifier 35B and the transformer 33 to the tip and ring terminals 31 of the connected telephone line.

Supervisory Control

The microprocessor 22 within the personal computer 20 is directly connected via the interface bus 28 to the interface card 15 and provides general supervisory control over its operation. To accomplish this, the EODR signal on output 45 (one of which appears each time the translation of an incoming analog sample is completed) is applied to increment a 4-stage counter 70 which issues an output interrupt signal on line 72 for each group of 16 incoming words. The interrupt signal on line 17 is applied to a selected one of the available interrupt request lines on the interface bus 28 (the particular line IRQ3 to IRQ7 at interface slot pins B21-B25 may be jumper-selected at the time of installation to avoid conflicts with other peripherals issuing interrupts).

When data is being sent or received over the telephone line 30, control of the execution of microprocessor 22 is passed to an interrupt handling routine resident in the memory 24. This single routine, the details of which are set forth in the accompanying assembly language listing for the INTS module, calls routines for handling both transmission and reception in accordance with the currently selected mode of operation. These interrupt handling routines process incoming data words from incoming data shift register 43 as those incoming words are assembled in a RAM storage area by the DMA transfer mechanism described above. Secondly, the interrupt handling routines process outgoing information, assemble the outgoing data words indicative of analog sample amplitudes in a RAM storage area pending the DMA transfers to the output latch 54. Note that the single interrupt from line 72, issued on every 16th. received word, triggers the handling of the received data being accumulated in the DMA buffer as well as the assembly, in the transmit DMA buffer, of the outgoing data to be converted into analog sample values.

In addition, the microprocessor has access at any time to information about the status of the telephone line, and may send control commands to the interface unit 30 to control that unit's operation. The control lines 47 which exchange control information between the control unit 50 and the interface bus 28 include address lines (at interface slot pins A22-A29 to bus 28) which must contain a particular pattern of bits (in the range 35C to 35F, hexadecimal) designating information to or from the interface unit. When the appropriate address is detected, data from the interface port is placed in the board control latch register 74 to control the line. One bit position of latch 74 may be advantageously used to control an electronic off-hook switch seen at 75 in FIG. 1 (which is closed or placed "off hook" to connect the interface unit to the telephone line). A second bit position in the control latch register 74 may be used to connect a speaker 76 to the output of the amplifier 35A by activating a switch 77. A third bit position may be used to reset the AIC 40.

Correspondingly, a sense latch register 80 includes bit positions which are set by the status of the telephone line. A first bit is set whenever a ringing signal detector 82 connected across the telephone line terminals 31 detects the presence of ringing signals of a predetermined amplitude. A loop current signal detector seen at 84 sets a second bit whenever loop current exceeding a predetermined value is present, indicating an active connection to another system. These status signals may be obtained at any time by a programmed inquiry which places the appropriate I/O address on the address leads within control bus 47.

Programming Overview

In the preferred embodiment of the invention, all digital processing of the digitally-expressed analog sample values which are supplied by and delivered to the interface card 15 are processed by the microprocessor in the host computer. Similarly, the digital information which specifies the telephone line status, as well as control information which takes the telephone line on and off hook, is handled by the host microprocessor. As a consequence, substantially any communication and communication control function using a voice-band channel may be implemented with the hardware disclosed above (and nothing more) by providing appropriate programming for the host computer 20.

Figure 4:
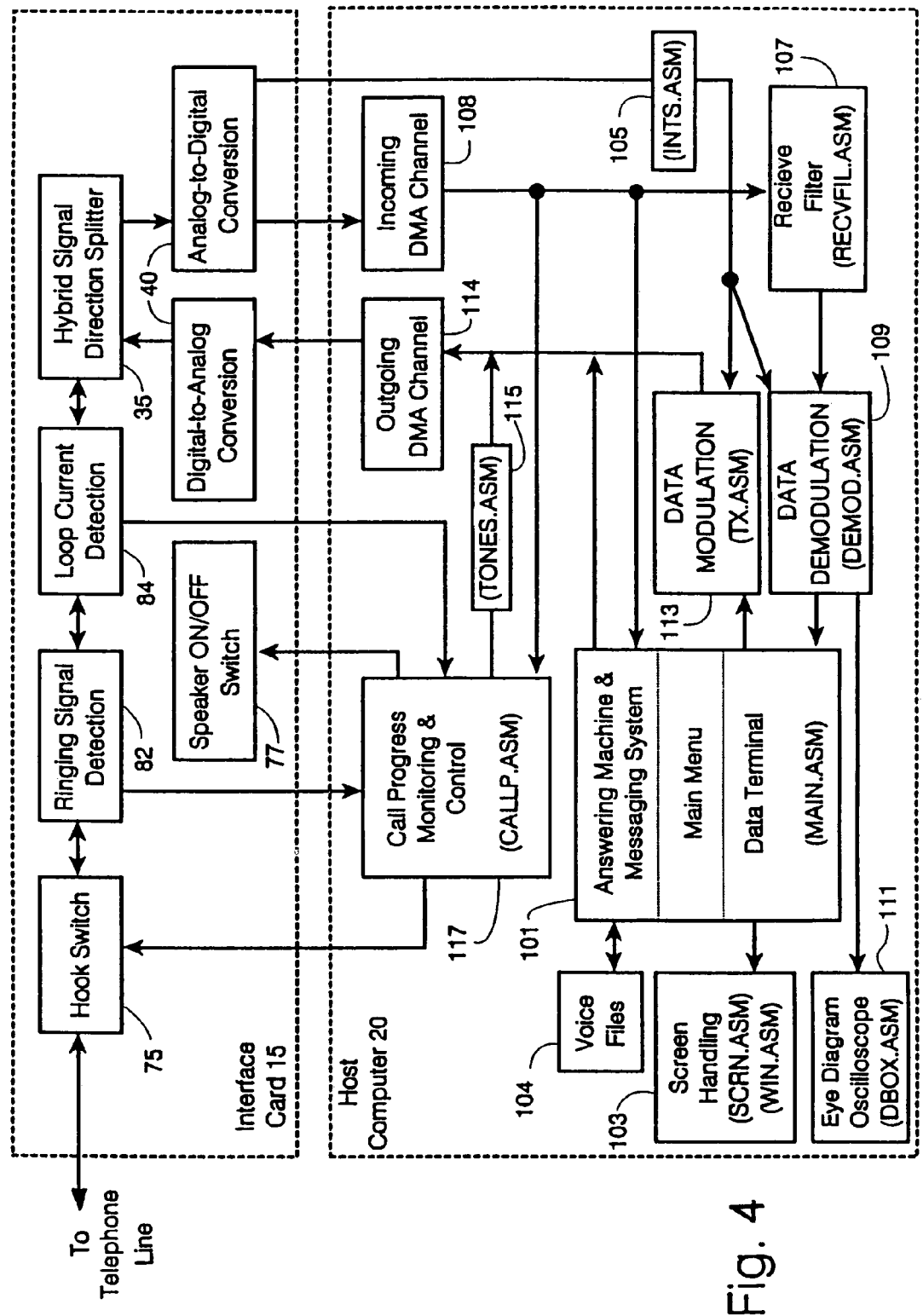
FIG. 4 is a functional block diagram illustrating the interaction of the major functions implemented by the host processor under program control.

Application Ser. No. 08/948,833, filed Oct. 10, 1997 and issued on Feb. 16, 1999 as U.S. Pat. No. 5,872,836 (the '836 patent), includes at pages 33-221 a program listing, which is hereby incorporated by reference in its entirety. The program listing provides numerous functions which allow the combination of the host computer and the interface card to support a rich assortment of voice and data communications applications. The listed source programs are written in conventional assembly language and may be assembled, linked and executed on any IBM-compatible Personal Computer which has sufficient operating speed and which is equipped with the expansion card described above. The assembly language which defines the program and data structures needed to implement the illustrative embodiment is divided into 12 separately listed modules which are summarized below and depicted in FIG. 4 of the drawings:

| | |
|---|---|
| MAIN.ASM | The MAIN.ASM module seen at 101 in FIG. 4 initializes the interface card hardware and the screen, transmit and receive buffers in the host computer's RAM memory. It displays the main menu by calling the screen handling routines in SCRN.ASM and WIN.ASM as seen at 103 and decodes any user keystrokes which control the system's operation. In addition, it provides routines capable of answering the phone, recording and playing back voice messages to and from standard DOS disk files as indicated at 104, as well as routines that manage the system when it is operating as a data terminal when keystroke data are directly transmitted and received (via modem processing) over the telephone link. |
| INTS.ASM | This module indicated at 105 handles the interrupts generated by the interface card each time 16 incoming digital samples have been accumulated in the host computers RAM memory by prior DMA transfers as |

-continued

| | |
|---|---|
| | determined by the counter 70 seen in FIG. 3. The interrupt handler calls routines for handling data transmission and reception. In addition, INT.ASM responds to telephone ringing signals generated by detector 82 and line current indications from loop current detector 84 on the interface card 15 as seen in FIGS. 3 and 4. |
| RECVFIL.ASM | This module, seen at 107 in FIG. 4, contains the filtering routines used to pre-process the incoming analog signal samples which are received via the incoming DMA channel seen at 108 in FIG. 4. When the system is operating as a 1200/2400 baud modem, the RECVFIL.ASM routines 107 process the accumulated digitally expressed sample values from the interface card and performs band-splitting and phase-splitting digital filtering to create filtered samples for demodulation, as well as automatic gain control and baud rate synchronization. |
| DEMOD.ASM | This module, shown at 109 in FIG. 4, demodulates the filtered sample value from RECVFIL.ASM into data. |
| DBOX.ASM | The DBOX.ASM module at 111 provides routines which allow the host computer's screen to provid an scilloscope-like eye-diagram display useful for monitoring the performance of the system during modem data reception. |
| TX.ASM | This module, seen at 113, modulates digital data to be transmitted into sample amplitudes which are placed into the transmit buffer from which they are moved via the outgoing DMA channel seen at 114 to the interface card for digital-to-analog conversion into a voice-band analog modem output signal which is transmitted over the phone line. TX.ASM also provides digital filtering to confine the transmitted analog signal to its assigned passband. |
| TONES.ASM | This module, indicated at 115, generates touch-tones and answer tones used by the system to perform conventional dial-up telephone signalling. |
| CALLP.ASM | The call progress monitoring and control module seen at 117 provides supervisory control of the telephone link. It performs band-pass filtering of the receive samples from the interface card in order to detect ringing signals, answer tones, and touch-tone signals, and uses the tone generating routines in TONES.ASM at 115 to produce comparable outgoing tones. |
| WIN.ASM | This module, indicated at 103 along with SCRN.ASM, manages the pop-up windows which appear on the host computer's screen as part of the user interface. This module employs pre-generated character definitions which are specified in the separately listed include file SFT_WINS.INC. |
| SCRN.ASM | This module provides screen management routines used when the system is operating in terminal mode. |
| EQUATES | This module defines commonly used numbers and keycodes referred to in the other modules. |

The MAIN.ASM module initializes the system and provides the primary user interface. In the discussion of MAIN-.ASM and the other modules which follows, unless otherwise noted, the routines being discussed will be identified by their labels and may be found within the listing for the particular module being described.

When the system is started (typically by the entry of the program's name at the operating system's standard command prompt), it is loaded for execution from disk, and execution begins at the label SOFT_MODEM. The amount of memory allocated to the program is reduced to the size of the program plus the size of the stack, and the routine ALLCATE-_BUFFERS is used to create 8 k (16-bit word) memory buffers for the both the transmitted and received sample amplitude values. The video display is then initialized and the routines INIT_AIC and INIT_DMA are called to initialize the TLC32044 analog interface circuit 40 on the interface card 15, and to initialize both the transmit and receive DMA channels. A call is then made to the routine WEDGE_INT (listed in INT.ASM) which hooks into the COM2 interrupt (reconfigurable as COM1 through COM4).

A check is then made to determine if the user supplied the name of a voice-recording file to be played back along with the program name when the program was called at the DOS command line. If so, the routine PLAYBACK_MSG (to be discussed) is called immediately, with control thereafter being passed to MAIN_EXIT to terminate the program. In this way, the program can be loaded to play back a recorded voice message without invoking any other functions.

If no recorded message file was specified, ON_HOOK and SPEAKER_OFF are called to insure that hook switch 85 and speaker switch 77 on interface card 15 are both open, and the routine MAIN_SCREEN is begun. The routine INIT_SCREEN (in WIN.ASM) clears the screen and pops up a window for the main menu. The routine at GET_KEY monitors keyboard input and incoming ringing signals.

If ringing signals are detected, the routine ANSWERING-_MACHINE is called to take the telephone line off-hook and then call the routine PLAYBACK_MSG to play back a pre-recorded voice message. The routine PLAYBACK_MSG moves the contents of a disk file, which is a sequential file of digitally-expressed voice sample amplitudes, into the transmit buffer, with each transfer being followed by a call to TX_DMA_ON which enables a DMA transfer of the transmit buffer's contents for digital-to-analog conversion by the interface card 15. To conserve disk space, the file of digitally-expressed voice samples may be compressed prior to storage and decompressed prior to playback. After the recorded voice message is played for the caller, SEND_TONES (in TONE-S.ASM) sends a prompting tone to advise the caller that recording is starting.

The ANSWERING_MACHINE routine then calls RECORD_MSG to record the incoming message. A DOS file is opened to record the message, the routine INIT_AIC is called to ready the analog interface circuit 40 to receive at 9600 samples/second, and the incoming samples from the interface board are moved by DMA transfer to the receive buffer from which they are recorded on disk, in 4 kilobyte blocks, in a standard DOS file.

Main Menu Functions

The routine in MAIN.ASM beginning at MENU_COM-MAND processes user keystrokes to invoke functions selected by the user from the following available options which demonstrate the system's capabilities:

| KEY | OPERATION |
|---|---|
| F1 | Go to data mode by calling ORIGINATE_MODE_INIT followed by COMM_MODE, which takes keystrokes entered by the user and sends them to the transmitter (to be discussed), and looks for characters from the receiver and puts them on the screen. When operating in terminal mode, the user can press the F2 key to enter the display box mode by calling INIT_DBOX (in DBOX.ASM) in which case the received characters are buffered and keystrokes are processed through the display box menu. |
| F2 | Record voice off the telephone line by calling RECORD_MSG discussed above. |
| F3 | Play back a recorded voice message by calling PLAYBACK_MSG discussed ab ve. |
| F4 | Send an answer tone over the phone line by calling SEND_TONES (listed in TONES.ASM) as discussed above. |
| F5 | Perform ORIGINATE_MODE by dialing a phone number (using DIAL in TONES.ASM) and, if answered, attempts to establish a modem link (using CALLP_MAIN in CALLP.ASM which initiates the expansion card and enables the receiving DMA transfers) in 1200 baud originate mode (by calling INIT_RECV in DEMOD.ASM), and then calls COMM_MODE to perform |

-continued

| KEY | OPERATION |
|---|---|
| | communications with the remote modem. |
| F6 | Execute call progress functions by calling CALLP_MAIN (listed in CALLP.ASM). |
| F7 | Execute tone detection by calling TOUCH_TONE_DETECT (listed in CALLP.ASM). |
| F8 | Execute automated voice message handling by calling MESSAGING_SYSTEM. This routine uses DTMF (listed in TONES.ASM) to produce the dual dial tones for each digit to be dialed in a number taken from a list of numbers to be dialed. MESSAGING_SYSTEM plays back a message asking the person who answers the remote phone to press the touchtone "1" key on their stationset, then waits to accept the response, at which time MESSAGING_SYSTEM plays back a prompting message and then records the called party's response using PLAYBACK_MSG and RECORD_MSG, and then terminates the conversation by calling ON_HOOK. |
| Alt-H | Toggle between on/hook and off/hook using CHK_ON_OFF_HOOK. |
| Alt-S | Toggle the speaker between on and off conditions using CHK_SPKR. |
| Alt-P | Change parity by calling NEW_PARITY. |
| Alt-A | Toggle answering machine enabled/disabled states using CHK_ANSWER_MODE. |
| F10 | Exit the program and return control to DOS after calling DISABLE_INT (listed in INTS.ASM) to restore the original COM2 interrupt vector and disabling DMA transmission and reception. |

Screen Handling Routines

As seen in the listing WIN.ASM, the routine FILL_SCREEN fills the screen with a background color, WINDOW_UP moves a previously stored window image from a screen buffer to the active screen, and WINDOW_FLIP swaps the active screen memory with the contents of a screen buffer.

The screen is initialized for the terminal mode by a call to INIT_COMM_SCREEN (listed in SCRN.ASM) which is called when data mode is entered. This routine paints the screen blue by calling INIT_SCREEN (in WIN.ASM), which in turn calls WINDOW_UP, brings up data mode windows which indicate speed and parity, and then saves the written screen to a screen buffer for later use.

SCREEN_OUT (listed in SCRN.ASM) performs the terminal mode functions. After checking for special characters, received characters are displayed on the screen. Special characters are the line feed, carriage return and backspace characters, which are handled by the appropriate display-point repositioning functions. If the cursor is on the last line of the screen, a line feed or carriage return character causes the screen lines to scroll upwards. The routine PRINT_PARITY listed in SCRN.ASM is called to place the currently active parity and word length indications on the screen.

The display box mode is entered by calling INIT_DBOX listed in DBOX.ASM. INIT_DBOX calls routines which draw an oscilloscope face on the screen along with a menu of display box options (DBOX_MENU) and initializes the video controller to enable modification of all video planes. The display box may have up to eight points on the screen (POINT0-POINT7) each of which is defined by a data structure of type SCOPE_POINT. The routine PLOT_POINT places yellow dots on the screen using the publicly declared horizontal and vertical coordinates X and Y. Each dot displayed consists of three lines of dots. RESTORE_OLD removes the yellow pixels and replaces them with either light gray, dark gray or blue, depending on whether the pixel is positioned on the blue background of a reference line. DO_COLOR reads the old point out of the data structure and is called three times, once for each color. SAVE_COLOR saves the bits is also performed once for each color and saves the bits where the new dots will go. GET_COLOR reads the video RAM and checks for an intersection between a new oscilloscope dot and the desired color. The eye diagram of the incoming signal is produced by the demodulation routine DEMOD in DEMOD.ASM which, at the label DISPLAY_BOX, sets the variables X and Y and calls PLOT_POINT.

Call Progress Monitoring

The routines for monitoring and controlling the telephone circuit connected to the interface card 15 are listed in CALLP.ASM which begins by defining various coefficients and delay line values used by the call progress filters.

The routine CALLP_FILTERS executes a filtering algorithm for each input sample value in the received sample buffer, and calculates a mean square output level value for each filter. As indicated by the comment lines in the assembly language listing, the DC component is first removed from the sample value, and the input sample is then processed by the ANSWER_TONE_FILTER routine, at the end of which a check is made to determine if the system is currently waiting for the answer tone to end (which occurs during the originate mode training sequence to be described). The voice filtering algorithm may then performed to obtain a means square voice level indication (in the CALLP.ASM listing, the voice filter algorithm has been commented out to reduce runtime, but is retained here for illustration). Next, the call progress filtering routine is performed to detect dial tones, busy tones, and ringing signals. The mean square level (power level) output from each filter is transferred into a holding location for CALLP_MAIN to test later whenever SAMPLE_COUNT is decremented to zero.

The DTMF_FILTERS algorithm performs basically the same function as the call progress filters described above, except that the dual tones are written. In this illustrative embodiment, a filter for the touch-tones for "1" only are present, and the detection of a received "1" tone is used in the example voice message handling system implemented by the routine MESSAGING_SYSTEM (in MAIN.ASM) described above. The routine GET_TOUCH_TONE detects the "1" touch tone and waits for it to terminate.

The call progress system is initialized by CALLP_INIT which initializes the analog interface circuit 40 and the input counters. The mean square outputs are inspected every 256 sample times (35.5 millisecond intervals) to simplify division of the mean square values.

CALLP_MAIN performs the DMA initialization and waits for 256 samples to be received and the filter outputs to be computed. It then tests the mean square values to determine if an answer tone has a sufficient magnitude (at least 4000H and also greater than ¼ of the total energy on the line), and that such a tone has been present for a predetermined duration. CALLP_MAIN also calls PRINT_CALLP which displays the mean square filter output levels (useful for testing and debugging). The routines TOUCH_TONE_DETECT and PRINT_DTMF are similarly available to indicate the receive levels coming through the DTMF filters for testing purposes.

The routine GET_END_ATONE is called after a valid answer tone has been detected. It resets the call progress counters to 4.44 milliseconds in order to detect the end of an answer tone more quickly This routine also enables the transmitter DMA to start the 1200 bps transmitter as part of the training sequence leading to 2400 baud transmission. The routine then waits for the remote location to terminate the answer tone, which triggers the beginning of the 1200 bps receiver function. As soon as the end of the answer tone is detected, the AIC is set to receive at 9600 samples per second.

Receiver Filtering, AGC and Interpolation

The digitally expressed incoming analog sample amplitudes are processed by the microprocessor 22 in the host computer system 20 to filter the desired received signals from other signals outside its passband, to split the incoming signal into its two phase-shifted quadrature components, to regulate the signal level of the incoming signal by means of automatic gain control processing, and to compensate for variations in the baud rate of the incoming data by an interpolation procedure. All of these steps, which occur prior to demodulation, are handled by the module listed in RECVFIL.ASM.

Filtering consists of running the samples through either a high or low bandpass filter to reject the modem's local transmitter. Phase splitting reduces the samples to two sets of complex numbers (real and imaginary) for each baud time of samples (the baud rate being 600 per second), resulting in 1200 complex numbers per second.

The phase splitting occurs at FILTER_PQ in RECVFIL.ASM. FILTER_PQ is a two stage filter specifically designed to reduce the number of multiplication's and thus reduce execution time. Because of the computational burden placed on the host computer's processor when filtering and demodulating the incoming analog samples, it is essential that efficient algorithms be employed if processors which are in widespread use are to be capable of handling the high baud rates employed by conventional modems now in use. The efficiency of the FILTER_PQ routine, when combined with the efficient demodulation scheme to be described, has been shown to be capable of receiving and demodulating a conventional V.22bis, 2400 baud modem transmissions when executed by a conventional IBM-AT-class Personal Computer employing an Intel 80286 microprocessor operating at 12 Mhz.

As can be seen at the label FILTER_LOOP, the Cosine and Sine variables are either zero or plus or minus ¼. These values reduce the number of multiplication's and improve operation speed. LOW_STAGE1 and HI_STAGE1 do the pass-band to base-band conversion (4800 and 9600 sample rate conversion down to 2400 samples per second). LOW_STAGE1 performs the front end filtering of the receive low band samples. 4800 samples per second are reduced to 2400 by reading in a single sample and skipping the second because the second Cosine is zero for a total of two samples per loop. HI_STAGE1 reads in the 9600 samples a total of two times, skipping every other one (4 samples per loop) thus reducing the number of samples to 2400. Next the output of the first stage is sent through STAGE2 to be filtered.

At REAL_DONE, the output value of this routine is divided by 128 or 16 depending on the AGC reaction speed (AGC computed over 16 or 128 samples) and then the absolute value is added to the AGC sum. Each output is then AGCed to bring it up to the correct level.

The same samples are then processed in the same way by the imaginary filter, DO IMAGINARY. At IMAG_DONE, the imaginary number is added to the AGC sum variable and the multiplication is performed to yield the automatic gain controlled output value. At this point, one quarter baud times worth of samples (one 2400th of a second) have been computed, and the process proceeds by reducing the sample rate to 1200 through the interpolator. Because two or four samples per loop are being handled, the routine is optimized to reduce the number of delay line shifts needed.

The INTERPOLATOR_ROUTINES perform the baud loop timing for the modem by computing one set of real and imaginary numbers for each two sets of input samples. The routine also looks for differences in timing between the input sample rate and the remote transmitter's sample rate. If the remote transmitter's crystal frequency is a littler faster than the sampling rate established by the analog interface circuit 40 so that, for example, the remote transmitter is sending 1201 real and imaginary pairs per second instead of the standard 1200, the INTERPOLATOR_ROUTINES will generate an additional pair of samples every second. Conversely, one fewer pair will be generated if the remote end is operating at a slower rate than expected. This allows the disclosed arrangement to lock onto the remote end's transmitted baud rate without having to adjust the rate at which samples are delivered via the fixed-rate DMA transfers required by the host computer system.

INTERPOLATOR_ROUTINES is called by a pointer named BAUDLP_VECTOR immediately after the label ADD_IMAGINARY in RECVFIL.ASM. This routine alternates between buffering the first set of samples and secondly, computing the 1200 rate real and imaginary inputs required by the receiver. Inside SAVE_S1 there is a counter called QUAD_COUNT which, when decremented to zero, indicates that it is time to compute new interpolator coefficients by a jump to NEW_COEFF. This routine looks at the BAUD_X variable in DEMOD.ASM for an underflow or an overflow. These conditions indicate it may be time to compute and extra set of real and imaginary numbers or to skip the next pair. The final sets of real and imaginary numbers (Ps and Qs) are stored in buffers called REAL_BUFFER and IMAG_BUFFER. Because the FILTER_PQ routine can return back with anywhere from 1 to 3 sets of Ps and Qs, those sets are buffered so that DEMOD can handle the under flow/overflow.

When INTERPOLATOR_ROUTINES is finished, control is returned to FILTER_PQ which then loops three more times, followed by a check to determine if the end of the receive sample buffer has been reached, and if the filter delay lines are full. If so, the delay line variables are copied from the end of the buffer to the beginning, the pointers are reset, and the routine is exited. By using long buffers for the delay lines, it is unnecessary to constantly shift these numbers within the delay lines, thus saving execution time.

Demodulation

When filtering and interpolation are completed, control is returned to label EQUALIZER_BUF_CHECK in DEMOD (listed in DEMOD.ASM). A check is performed to determine if there are two sets of Ps and Qs in the buffers. If present, they are copied to equalizer input buffers named EQR_DELAY and EQI_DELAY. At this time, the BAUD_SUM variable is set for use by the baud loop routine used for interpolation. BAUD_SUM is set by adding the absolute values of the first set of Ps and Qs and subtracting the second set.

The next routine provides automatic gained controlled amplification (AGC). The first thing done is a check of the baud counter to see if four or thirty-two baud times have passed (corresponding to the 16 or 128 divisor used to calculate the AGC average in FILTER_PQ as discussed above). If appropriate, a check is then to determine if the flag that indicates a valid energy level on the phone line has been set. If not, at ENERGY_CHECK, the current energy level (AGC_AVERAGE) is inspected to se if it is above the minimum level (−43 dBm) indicated by ENERGY_THRESHOLD. If there is still no energy, jump (via NO_ENERGY) to EQUALIZER_FULL_CHECK at the end of DEMOD which insures that the equalizer delay lines do not overflow.

If there is energy for the first time, calculate a new AGC multiplier (at NEW_LEVEL) and start up the receiver. This routine is needed when the user has entered F1 from the initial command buffer (direct to data mode) in order not to run the adaptive equalizer with no input signal. If energy has already been detected and the correct number of baud times has been reached, control is passed to AGC_TESTS.

Before the AGC tests are performed, a routine labeled CHECK ALPHA slows down the equalizer gain term after 256 baud times. The variable ALPHA is high during training so as to bring the receiver up more quickly. After 256 baud times, ALPHA is reduced to increase performance and reduce variability.

If the AGC is in wide band mode (fast reacting), control then passes to WIDEBAND_AGC; otherwise, a check is made to see if the new AGC_AVERAGE is either one-half the level or greater than 1.5 times the last AGC_AVERAGE. If it is, control is passed to NEW_LEVEL to compute an AGC multiplier just on that new value. This lets the receiver act quickly to gain hits on the phone line. If neither of these tests pass, the routine adds 1/8th of the new to 7/8these of the old level, and computes a new multiplier from the sum. In this way the AGC reacts smoothly and does not vary quickly, which improves performance on a line with little signal level variations.

COMPUTE_AGC takes the new AGC_AVERAGE and computes AGC_XSUBE and AGC_MANT, two variables which are used to adjust any receive signal level the optimal level needed by the receiver. Also, the AGC is changed from wide-band to narrow mode after the first 32 baud times (as seen immediately before the label DISPLAY_BOX in the AGC routine).

DISPLAY BOX checks the RECV_FLAGS register to see if the user is in the display box view mode. If so, the current display box variable is gathered by calling the routine pointed to by DBOX ROUTINE and then the appropriate point is plotted on the scilloscope screen as noted earlier.

The next routine updates the baud loop variables used by the interpolator routine in FILTER_PQ. The baud loop is controlled by two different loops. A first order baud loop does fine tuning and a second order loop makes coarse adjustments to get the baud loop close to the optimal timing. Every eight baud times the sign of BAUD_SUM is checked. Depending on the sign, a decimal 160 is added or subtracted from BAUD_X. Also, BAUD SUM is divided by 128 and added to LOOP_INT2, the second order baud loop integrator. LOOP-_INT2 is then checked to make sure it stays within the bounds of F200 to OEFF, hexadecimal. This puts a maximum limit on how much the baud loop can correct for timing differences between itself and the remote modem.

At BAUD_LOOP2, a counter called LOOP2_CNT is decremented. When it reaches zero, the sign of LOOP INT2 is checked and 160 is added or subtracted from BAUD_X. At label GET_NEW_COUNT, LOOP2_CNT is reloaded from the table BAUD_LOOP2_TABLE (defined at the beginning of the DEMOD.ASM listing immediately before the code). The value loaded from BAUD_LOOP2_TABLE is determined by an offset into the table which comes from the high order eight bits of LOOP2_INT. As LOOP2_INT grows to bigger levels, LOOP2_CNT is reloaded with a smaller and smaller count, causing the second order baud loop to make more frequent adjustments to BAUD_X. BAUD_X is then used by the interpolator to know when to skip or add an extra set of Ps and Qs to the equalizer delay line.

The routine EQUALIZER_OUTPUT generates the actual receive data point from the incoming Ps and Qs. The algorithm performs a complex number multiplication between the complex numbers in the equalizer delay line and the complex taps. Each of the last 7 baud times (14 taps) of Ps and Qs are multiplied with their respective taps and the results are summed. What results is the complex number RZN+j IZN, which is the data point.

In the following routine, PHASE_ROTATION, the equalizer output is rotated into the correct quadrant by the Cosine and Sine of the phase angle PHI. This is done through the multiplication of RZN+j IZN by negative COSINE+j SINE. The resulting point is RYM+j IYM.

The next routine performs the calculations to determine which point in the signal constellation RYM+j IYM is closest to. Once this is determined, the data pattern associated with this point is known and the demodulation of the analog signal is complete. Also, the nearest perfect point is saved into DEC_R+j DEC_I and an error vector from this point to the point we demodulated is generated and stored into R_ERROR+j I_ERROR. There are separate routines 1200 and 2400 baud because the signal constellations are different.

For 1200 baud, because there is only four possible points, the process is as simple as comparing the signs of both RYM and IYM to determine which of the quadrants the point resides in. At label DECISION_1200, the sign of RYM is tested. If it is positive, the absolute decision point, 49 * 256, is placed in DEC_R and this value is subtracted from RYM to get the error vector, R_ERROR. Also, the offset into DECISION_TABLE, where the actual data sent from the other end is decoded, is placed into the BL register. This process is repeated for IYM to yield DEC_I and I_ERROR. At the label READ_DECISION, the receive data is read out of DECISION_TABLE and placed into RECV_DATA.

The process for decoding data at 2400 bits per second is a little different in that there are sixteen possible decision points. Consequently, the routine inspects the sign of RYM and j IYM, as well as their magnitudes. Once the error vectors and decision points are determined, the code branches to READ_DECISION and the receive data is read out of DECISION_TABLE as in the 1200 case above.

The next step is to update the taps with the counter-rotated error vector. By doing this, the taps learn what types of errors are being generated by the phone line and they move in a direction that can correct for these errors. The counter-rotated error vector is scaled down by ALPHA so that the taps cannot be significantly changed by any one baud time error. The counter rotation is done my multiplying R_ERROR+J I_ERROR by COSINE–j SINE, and then again multiplied by ALPHA. The results are placed in AREN+j AIEN.

The routine DO_TAP_UPDATE multiplies all fourteen of the taps (RW+j IW) by (AREN+J AIEN). Before this, however, the taps are all "bled" a little to keep them from becoming too big. This is done by repeating the macro BLEED_TAP (defined at the beginning of the DEMOD.ASM listing) 28 times, each time adding four to a negative tap or subtracting four from a positive tap, thus pulling all taps toward zero. BLEED_TAP is performed for both the real and imaginary parts of all taps.

Next, the phase loop is updated so that it can recalculate COSINE and SINE for the next baud time. To do this, the output of the equalizer RYM+j IYM must be multiplied by the negative of the decision point DEC R–j DEC I. Only the imaginary vector is needed so RERR need not be recalculated. Thus, IERR=(IYM * DEC R)–(RYM * DEC I). Also, the routine multiplies IERR by two to meet the needed gain for PHASE_UPDATE.

PHASE_UPDATE employs a first and second order phase loop which locks onto the phase roll of the remote transmitter. PHI is the new phase angle determined by the code. The upper eight bits of PHI are then used to access a pre-computed COSINE and SINE from the tables listed in TONES.ASM.

This algorithm use of tables indexed by the phase angle PHI substantially improves execution speed by eliminating multiplications.

The S1_DETECT routine functions is a matched filter which detects the presence of the S1 digit sequence defined in the V.22bis CCITT specification. The S1 transmit sequence is used to signal the remote receiver that the other end is a 2400 baud modem, or that the other end wants to initiate a 2400 baud retrain. The S1 sequence is composed of unscrambled 11's then 00's at 1200 baud that create a specific tone on the line. S1_DETECT determines the presence of the tone by looking at the numbers in the real equalizer delay two baud times apart. If the difference in these numbers is above a certain threshold a counter, S1_COUNTER, is incremented. If the difference is below the threshold, the counter is decremented by four. If the counter ever reaches 20, S1 has been detected.

The routines starting at DATA_DECODE perform the necessary computations to parse the incoming data stream into ASCII characters.

At 1200 baud, the two received data bits are stored in bits 2 and 3 of RECV_DATA.

At 2400 baud, the incoming data is decoded in accordance with the V.22 and V.22bis specification bits 0 through 3 are valid data. First, differential decoding is performed by subtracting the previous baud times' bits 2 and 3 from the baud time's data. Next, the Gray decoding process checks bit 3 and, if it is zero, bit 2 is inverted. Descrambling parses four bits at a time so that, at 1200 baud, the first baud times data bits are placed into DATA__1200, the routine waits for the second baud times data, and then combines the two at COMBINE__1200_DATA before descrambling. DESCRAMBLE__4 performs the descrambling routine specified in V.22 and V.22bis.

After the descrambler, the data is now in the same format as sent to the modem by the remote data terminal equipment: asynchronous ASCII data. The routine then searches the incoming data for a start bit, parse the next eight data bits into an ASCII character, and then puts the result into the receive character buffer for the terminal loop to display on the screen.

At RECEIVE_PARSER, a state variable R_PARSE JMP is tested to see if it's zero and, if it is, the routine jumps to CHECK_FOR_START to look at the four bits out of the descrambler to see if there are any zeros present. If there are, the data is moved into R_PARSE_DATA, and R_PARSE__JMP is set to PARSE__8. The next time into the loop, RECEIVE_PARSER jumps to PARSE__8 where the next four receive bits are combined into R_PARSE_DATA. Four data bits are still needed to complete the ASCII data, so R_PARSE_JMP is set to PARSE__12.

At PARSE__12, enough data has been collected to form the character, so it is now necessary to determine where the character is in the received 12 bits of data. This depends on where the start bit is located. PARSE__12 begins by shifting the received 12 bits right until a zero enters the carry flag. Once a zero is detected, the eight data bits of the receive character are in the AL register, from which they can be stored into RX_CHAR_BUF, and the pointers into R_CHAR_BUF are updated. The bit counters are then checked to see how many of the received 12 bits are left. Depending on where the start bit was located there can be up to three data bits left over. These bits are checked to see if there is another start bit. If there is, the routine recreates R_PARSE_DATA so that it has four valid bits in the low order and resets R_PARSE_JMP to PARSE__8. Code outside the interrupt handling routines checks to see if any characters have been placed in RX_CHAR_BUF and displays them in terminal mode.

The last thing done by the receiver, at EQUALIZER__FULL_CHECK, is to make sure that the equalizer delay line buffers are not full. The previous 6 baud times worth of Ps and Qs must always be available; consequently, when the equalizer is full, the last 12 Ps and Qs are copied to the beginning of the EQR_DELAY and EQI_DELAY. Also, the EQUALIZER_IN pointer is reset to point into location 13.

Modulation

The transmitter routines listed in TX.ASM are substantially less complex than the demodulation routines because modulation is a determinate process.

The first two routines in TX.ASM, INIT_TX and SETUP__SAMPLE_COUNT, initialize the transmitter variables. INIT_TX resets the pointers into the transmitter sample buffers and calls SETUP_SAMPLE_CNT which tests to see if transmission is to be performed in the low band (8 samples per baud time) or high band (16 samples per). SETUP__SAMPLE_COUNT also sets up the transmit buffer threshold, SAMPLE_COUNT, to either 100 samples for low band or 200 for high band. SAMPLE_COUNT insures that there are always enough samples in the buffer to handle the case where the transmitter routine will not receive control for a prolonged period (which occurs, for example, when interrupts are turned off while the PC is changing video modes). This safeguard adds a 20 ms delay into the transmit path.

TX1224, the code which performs the actual transmission, is reached through the transmit vector, TX_VECTOR, in the interrupt handling routine SOFTMODEM in INTS.ASM which, as described above, receives control each time the interface card 15 generates an interrupt at every 16th receive sample.

The first thing TX1224 does is check the number of samples in the transmit buffer. If the count is less than SAMPLE_COUNT, another baud times worth of samples is processed. DO_TX is the actual start of the transmitter process. Flags are first checked to see if the system is operating in a forced data mode in which all marks (ones) or the dibit pattern S1 is to be sent. If either of these flags is set, control is passed to SEND_MARKS.

At CHECK_TX_DATA, the routine first checks to see data is being parsed. If so, control is passed to the routine pointed to by T_PARSE_JMP. If not, control is passed to CHECK__TX_CHAR where a test is performed to determine if any ASCII characters to be sent are present in TX_CHAR_BUF. If there are none, control is passed to SEND_MARKS. If characters are ready to be sent, they are read from TX_CHAR_BUF, the pointers to that buffer are updated, and a start bit is inserted into the data before it is stored in SEND__DATA. The parser vector, T_PARSE_JMP, is set to PARSE__4__2_DATA.

The PARSE_DATA routines are listed at the end of TX.ASM. PARSE__4__2_DATA sets the parser vector to PARSE__2_DATA, obtains the next four data bits of the ASCII character and returns. PARSE__2_DATA then takes the last data bit of the character, appends on three stop bits, and checks for another character to be sent. If there are no more characters to be sent, the routine resets T_PARSE_JMP to zero and returns. If there is a character to be sent, the routine gets the character and updates the buffer pointers, and then shifts the character left three bit positions such that this new character is given a start bit. The routine then inserts the two remaining bits of the last character and saves it off. Next, the new character is shifted right by four, a stop bit is inserted, and T_PARSE_JMP to set to PARSE__4__4_DATA. PARSE__4__4_DATA parses the next four bits of the TX char and sets T_PARSE_JMP to PARSE__4__0_DATA. PARSE__4__

0_DATA parses the last three bits of the second data byte plus the stop bit and resets T_PARSE_JMP to zero so that the process is returned to state 0.

As seen in TX.ASM at SCRAMBLER, the data is scrambled using the algorithm specified by the V.22 and V.22bis specification. At CHECK_1200, the low order two bits of the scrambler output are saved for the next baud time. The next two processes, GRAY_ENCODE and DIFF_ENCODE perform the appropriate Gray and differential coding defined in the V.22 and V.22bis specification.

The next routines process the transmit data into sample amplitude values which are delivered to the interface card 15 for digital-to-analog translation by the AIC 40. For each possible data value there are six sets of samples, and the pointers to these samples are called AN0_PTR, AN1_PTR, AN2_PTR, BN0_PTR, BN1_PTR, and BN2_PTR. AN0_PTR and BN0_PTR are read from a table at an offset location equal to the current transmit data value. The other four pointers are the AN0 and BN0 pointers saved from the last two baud times. Next, the transmit sample is created by adding the three values pointed to by the AN pointers, multiplying them by 1 or −1 depending on which sample is being formed, and putting the result into TEMP_TX_BUF. Next, the three values pointed to by the BN pointers are added together and the sum is either added or subtracted from the corresponding TEMP_TX_BUF value depending on the 1 or −1 multiplier. This process is done for either 8 or 16 samples, depending on whether transmission is to be made in the low or high band respectively. Once the samples are completely formed in TEMP_TX_BUF, they are copied into the transmit sample buffer making sure to take into account the position of the end of the buffer.

When transmitting low band samples during the training sequence, it is necessary to change the receive sample rate from 7200 samples per second (needed for call progress functions) to 9600 samples per second needed by the receiver code. To change the sampling rate, AIC commands are imbedded into the data stream in the routine SEND_AIC_CMDS. This routines takes a transmit sample, ORs it with binary 3 which tells the AIC there is a command following this data sample, and the puts the command into the next location. To change the sample rate, two consecutive commands are sent.

The process differs during high band transmission. Alternating samples are filled with the sum of the AN's and then the sum of the BN's, and the need to send AIC commands does not arise; consequently, there is always room in the sample buffer for a full baud times worth of samples. Once the TX samples have been moved into the TX sample buffer, the HIGH_BAND_FILTER routine shifts the AN and BN delay lines and returns.

The functions provided to the user by the program described are, of course, merely illustrative of the communications functions which can be implemented by suitably programming the host processor to exchange information with the interface card. In addition to the 1200 baud, originate mode modem communications capability implemented as operational code in the program listing which follows, much of the code necessary to implement 2400 baud V.22bis modem communication is also included in the following listing, although a fully operative 2400 baud system has not been completed and hence the 2400 baud routines that are included have not been fully tested. It should also be noted that the disclosed hardware, suitably programmed, can provide a variety of additional functions, such as facsimile and synchronous data transmission, as well as other modem modulation schemes such as the Bell 208 or U.S. Robotics HST asymmetrical transmission modes. Additional routines for performing more elaborate line equalization, echo suppression, adaptive transmission rate adjustment ("fall forward" and "fall back" to adjust to transmission noise conditions), error correction and data compression algorithms can be readily implemented by programming the host processor to manipulate transmitted and received data, either on either a concurrent, real-time basis, or by processing the data before transmission begins or after it concludes. It should also be noted that, because the telephone interface operates under direct control of the host processor, it is unnecessary to embed control sequences (e.g. AT command code sequences) within the data stream to provide communications control functions. It is accordingly possible to much more rapidly respond to events which occur, either in the host computer, the telephone link, or at the remote data terminal equipment, so that flow control procedures (for example) can be more rapidly, more transparently, and more effectively handled than is currently possible with separate modems which must be controlled by escape signals imbedded in the data stream, typically with mandatory guard times which accompany the unique pattern of characters forming the escape signal.

Most importantly, however, the present invention is implementing virtually any voice or digital communications function which can be accomplished over voice-grade lines without needing different hardware. This versatility is achieved by transferring substantially all of the functionality from the conventional separate communications processor (which is typically programmed with resident firmware and/or employs special purpose analog or digital circuitry for signal processing functions) to the available processor in the host computer, which can be programmed to perform a suite of functions whether presently available or yet to be developed.

It is to be understood that the arrangement which has been described, and which is implemented by the programs listed in the '836 patent, is merely illustrative of one application of the principles of the invention. Numerous modifications may be made by those skilled in the art without departing from the true spirit and scope of the invention.

What is claimed is:

1. A modem for communicating in real-time between a computer and a remote device via a communications link, the computer having a host processor and a memory, the remote device operating at a remote baud rate, the modem comprising, in combination:

a telephone interface circuit connectable to the communications link for (i) receiving from the communications link an incoming signal representative of a communication from a remote device and (ii) delivering to the communications link an outgoing signal representative of a communication from the computer;

an interpolation routine executable by the host-processor to interpolate a stream of incoming digital sample values representative of the incoming signal into a modified stream of incoming digital sample values substantially synchronized to the remote baud rate;

a modem demodulation routine executable by the host-processor to translate the modified stream of incoming digital sample values into digital input data; and a modem modulation routine executable by the host-processor to translate digital output data into digital sample amplitude values representative of the outgoing signal.

2. A modem as claimed in claim 1, wherein the telephone interface circuit includes a hybrid circuit having a bidirectional port for receiving the incoming signal and for delivering the outgoing signal.

3. A modem as claimed in claim 1, wherein the interpolation routine, the modem demodulation routine and the modem modulation routine are stored in the memory.

4. A modem as claimed in claim 1, wherein the interpolation routine, the modem demodulation routine and the modem modulation routine each comprise, respectively, a set of machine language instructions executable by the host processor.

5. A modem as claimed in claim 1, further comprising a tone-dialing routine executable by the host-processor for generating a sequence of outgoing digital sample values representing a sequence of dual-tone signals for establishing a dial-up connection with the remote device.

6. A modem as claimed in claim 5, wherein the tone-dialing routine is stored in the memory.

7. A modem as claimed in claim 1, further comprising an answer-tone detection routine executable by the host processor for processing the incoming digital sample values to detect the presence of an answer tone received over the communications link.

8. A modem as claimed in claim 7, wherein the answer-tone detection routine is stored in the memory.

9. A modem as claimed in claim 1, wherein the incoming signal comprises graphical data.

10. A modem as claimed in claim 1, wherein the outgoing signal comprises graphical data.

11. A modem for communicating in real-time between a computer and a remote device via a communications link, the computer having a host processor and a memory, the modem comprising, in combination:
    a telephone interface circuit connectable to the communications link for (i) receiving from the communications link an incoming signal representative of a communication from a remote device and (ii) delivering to the communications link an outgoing signal rePresentative of a communication from the computer;
    a modem demodulation routine executable by the host-processor to demodulate a stream of interpolated digital sample amplitude values representative of the incoming signal, and to thereby provide a stream of digital input data; and
    a modem modulation routine executable by the host-processor to modulate a stream of digital output data, and to thereby provide a stream of digital sample amplitude values representative of the outgoing signal.

12. A modem as claimed in claim 11, wherein the telephone interface circuit includes a hybrid circuit having a bidirectional port for receiving the incoming signal and for delivering the outgoing signal.

13. A modem as claimed in claim 11, wherein the modem demodulation routine and modem modulation routine are both stored in the memory.

14. A modem as claimed in claim 11, wherein the modem demodulation routine and modem modulation routine each comprise, respectively, a set of machine language instructions executable by the host processor.

15. A modem as claimed in claim 11, further comprising a call-answering routine executable by the host processor when the incoming signal represents an analog voice signal from a remote caller, for transmitting an acknowledgement signal over the communications link and for recording an incoming message received over the communications link.

16. A modem as claimed in claim 11, further comprising a tone-dialing routine executable by the host-processor for generating a sequence of outgoing digital sample amplitude values representing a sequence of dual-tone signals for establishing a dial-up connection with the remote device.

17. A modem as claimed in claim 11, further comprising an answer-tone detection routine executable by the host processor for processing the incoming digital sample amplitude values to detect the presence of an answer tone received over the communications link.

18. A system for communicating in real-time between a computer and a remote device via a communications link, the computer having a host processor and a memory, the remote device operating at a remote baud rate, the system comprising, in combination:
    line interface circuitry connectable to the communications link for (i) receiving from the communications link an incoming signal representative of a communication from a remote device and (ii) delivering to the communications link an outgoing signal representative of a communication from the computer;
    an interpolation routine executable by the host-processor to interpolate a stream of digital sample values representative of the incoming signal so as to compensate for baud rate variation and to thereby provide an interpolated stream of digital sample values;
    a modem demodulation routine executable by the host-processor to demodulate the interpolated stream of digital sample values, and to thereby provide a stream of digital input data; and
    a modem modulation routine executable by the host-processor to modulate a stream of digital output data, and to thereby provide a stream of digital sample values representative of the outgoing signal.

19. A system as claimed in claim 18, further comprising conversion circuitry for converting the incoming signal to the stream of digital sample values representative of the incoming signal, at a sampling rate synchronized to a local clock signal.

20. A system as claimed in claim 18, wherein the line interface circuitry includes a hybrid circuit having a bidirectional port for receiving the incoming signal and for delivering the outgoing signal.

21. A system as claimed in claim 18, wherein the interpolation routine, the modem demodulation routine and the modem modulation routine are stored in the memory.

22. A system as claimed in claim 18, wherein the interpolation routine, the modem demodulation routine and the modem modulation routine each comprise, respectively, a set of machine language instructions executable by the host-processor.

23. A system as claimed in claim 18, wherein the interpolation routine is executable by the host-processor to compensate for timing difference between sample rates of the computer and the remote device.

24. A system as claimed in claim 18, further comprising a tone-dialing routine executable by the host-processor for generating a sequence of outgoing digital sample values representing a sequence of dual-tone signals for establishing a dial-up connection with the remote device.

25. A system as claimed in claim 24, wherein the tone-dialing routine is stored in the memory.

26. A system as claimed in claim 18, further comprising an answer-tone detection routine executable by the host processor for processing the stream of digital sample values representative of the incoming signal to detect the presence of an answer tone received over the communications link.

27. A system as claimed in claim 26, wherein the answer-tone detection routine is stored in the memory.

28. A system as claimed in claim 18, wherein the incoming signal represents graphical data.

29. A system as claimed in claim 18, wherein the outgoing signal represents graphical data.

30. A computer-readable medium having stored thereon instructions executable by a host processor of a computer to cause the host processor to perform functions comprising:
    interpolating a stream of digital sample values representative of a communication from a remote device, so as to compensate for baud rate variation between the computer and the remote device, and to thereby provide an interpolated stream of digital sample values;
    demodulating the interpolated stream of digital sample values, so as to provide a stream of digital input data; and
    modulating a stream of digital output data, so as to provide a stream of digital sample values representative of a communication to the remote device.

31. A computer-readable medium having stored thereon instructions defining a plurality of routines executable by a host processor of a computer, the routines comprising:
    an interpolation routine executable by the host processor to interpolate a stream of digital sample values representative of a communication from a remote device, so as to compensate for baud rate variation between the computer and the remote device and to thereby provide an interpolated stream of digital sample values;
    a modem demodulation routine executable by the host processor to demodulate the interpolated stream of digital sample values, and to thereby provide a stream of digital input data; and
    a modem modulation routine executable by the host-processor to modulate a stream of digital output data, and to thereby provide a stream of digital sample values representative of a communication from the computer.

32. In combination with a computer of the class comprising a processor, a memory, a system bus composed of conductors interconnecting at least the processor and the memory, an auxiliary circuit for communicating between the computer and a remote device via a communications link, the remote device operating at a remote baud rate, the auxiliary circuit comprising:
    interface circuitry connectable to the communications link for (i) receiving from the communications link an incoming signal representative of a communication from a remote device and (ii) delivering to the communications link an outgoing signal representative of a communication from the computer;
    an interpolation routine executable by the processor to interpolate a stream of digital sample values representative of the incoming signal so as to compensate for baud rate variation and to thereby provide an interpolated stream of digital sample values;
    a modem demodulation routine executable by the processor to demodulate the interpolated stream of digital sample values, and to thereby provide a stream of digital input data; and
    a modem modulation routine executable by the processor to modulate a stream of digital output data, and to thereby provide a stream of digital sample values representative of the outgoing signal.

33. An auxiliary circuit as claimed in claim 32, wherein the interface circuitry includes conversion circuitry for converting the incoming signal into the stream of digital sample values representative of the incoming signal, at a sampling rate synchronized with a local clock signal.

34. An auxiliary circuit card comprising the auxiliary circuit of claim 32, the auxiliary circuit card being connectable to the system bus.

35. An auxiliary circuit as claimed in claim 32, wherein the interface circuitry includes a hybrid circuit having a bidirectional port for receiving the incoming signal and for delivering the outgoing signal.

36. An auxiliary circuit as claimed in claim 32, wherein the interpolation routine, the modem demodulation routine and the modem modulation routine are stored in the memory.

37. An auxiliary circuit as claimed in claim 32, wherein the interpolation routine, the modem demodulation routine and the modem modulation routine each comprise, respectively, a set of machine language instructions executable by the processor.

38. An auxiliary circuit as claimed in claim 32, wherein the interpolation routine is executable by the processor to compensate for timing difference between sample rates of the computer and the remote device.

39. An auxiliary circuit as claimed in claim 32, further comprising a tone-dialing routine executable by the processor for generating a sequence of outgoing digital sample values representing a sequence of dual-tone signals for establishing a dial-up connection with the remote device.

40. An auxiliary circuit as claimed in claim 39, wherein the tone-dialing routine is stored in the memory.

41. An auxiliary circuit as claimed in claim 32, further comprising an answer-tone detection routine executable by the processor for processing the stream of digital sample values representative of the incoming signal to detect the presence of an answer tone received over the communications link.

42. An auxiliary circuit as claimed in claim 41, wherein the answer-tone detection routine is stored in the memory.

43. A auxiliary circuit as claimed in claim 32, wherein the incoming signal represents graphical data.

44. A auxiliary circuit as claimed in claim 32, wherein the outgoing signal represents graphical data.

45. A method of communicating in real-time between a computer and a remote device, the computer having a host-processor and a memory, the remote device operating at a remote baud rate, the method comprising, in combination:
    the host-processor executing a set of machine language instructions to interpolate a stream of digital sample values representative of a communication from the remote device, so as to compensate for baud rate variation and to thereby provide an interpolated stream of digital sample values;
    the host-processor executing a set of machine language instructions to demodulate the interpolated stream of digital sample values, so as to provide a stream of digital input data; and
    the host-processor executing a set of machine language instructions to modulate a stream of digital output data, so as to provide a stream of digital sample values representative of a communication to the remote device.

46. A method as claimed in claim 45, further comprising, in combination:
    when the communication from the remote device represents a voice signal, the host-processor executing a set of machine language instructions to provide a set of outgoing digital sample values representative of an acknowledgement signal and to record an incoming message received from the remote device.

47. A method as claimed in claim 45, further comprising, in combination:
    the host-processor executing a set of machine language instructions to generate a sequence of outgoing digital sample values representing a sequence of dual-tone signals suitable for establishing a dial-up connection with the remote device.

48. A method as claimed in claim 45, wherein the host-processor executing a set of machine language instructions to interpolate a stream of digital sample values representative of a communication from the remote device, so as to compensate for baud rate variation and to thereby provide an interpolated stream of digital sample values, comprises:

the host-processor executing a set of machine language instructions to interpolate a stream of digital sample values representative of a communication from the remote device, so as to compensate for timing difference between sample rates of the computer and the remote device.

49. In a system of the type including a host computer processor, a memory, and line interface circuitry for receiving an incoming signal representing a communication from a remote device and for delivering an outgoing signal representing a communication to the remote device, the remote device operating at a remote baud rate, a method of performing modem processing, comprising:

operating the host computer processor to execute an interpolation routine, so as to interpolate a stream of digital sample values representative of the incoming signal to compensate for baud rate variation and to thereby provide an interpolated stream of digital sample values;

operating the host computer processor to execute a demodulation routine, so as to demodulate the interpolated stream of digital sample values and to thereby provide a stream of digital input data; and operating the host computer processor to execute a modulation routine, so as to modulate a stream of digital output data and to thereby provide a stream of digital sample values representative of the outgoing signal.

50. A method of performing modem processing as claimed in claim 49, wherein operating the host computer processor to execute an interpolation routine, so as to interpolate a stream of digital sample values representative of the incoming signal to compensate for baud rate variation and to thereby provide an interpolated stream of digital sample values, comprises:

operating the host computer processor to execute an interpolation routine so as to compensate for a difference in timing of sample rates of the system and the remote device.

51. In combination with a computer of the class comprising a host processor and a memory, a communication system comprising:

line interface circuitry for receiving an incoming signal from a communications link and for delivering an outgoing signal to the communications link;

an interpolation routine executable by the host processor;

a demodulation routine executable by the host processor; and a modulation routine executable by the host processor, whereby, (i) by executing the interpolation routine, the host processor interpolates a stream of digital sample values representative of the incoming signal so as to produce an interpolated stream of digital sample values, (ii) by executing the demodulation routine, the host processor translates the interpolated stream of digital sample values into digital input data, and (iii) by executing the modulation routine, the host processor translates digital output data into digital sample values representative of the outgoing signal.

* * * * *